United States Patent [19]

Bezdon et al.

[11] Patent Number: 5,396,155
[45] Date of Patent: Mar. 7, 1995

[54] SELF-DIMMING ELECTRONIC BALLAST

[75] Inventors: Ronald J. Bezdon, Antioch; Peter W. Shackle, Arlington Heights; Randy G. Russell, Glen Ellyn; Kent E. Crouse, Hanover Park, all of Ill.

[73] Assignee: Energy Savings, Inc., Schaumburg, Ill.

[21] Appl. No.: 266,746

[22] Filed: Jun. 28, 1994

[51] Int. Cl.6 .............................................. G05F 1/00
[52] U.S. Cl. ...................... 315/291; 315/307; 315/314; 315/DIG. 4; 315/DIG. 7
[58] Field of Search ............... 315/219, 291, 224, 307, 315/DIG. 4, DIG. 7, 209 R, 314

[56] References Cited

U.S. PATENT DOCUMENTS

| | | | |
|---|---|---|---|
| 3,514,668 | 5/1970 | Johnson et al. | 315/205 |
| 4,017,785 | 4/1977 | Perper | 321/4 |
| 4,220,896 | 9/1980 | Paice | 315/205 |
| 4,251,752 | 2/1981 | Stolz | 315/DIG. 7 X |
| 4,370,600 | 1/1983 | Zansky | 315/244 |
| 4,677,345 | 6/1987 | Nilssen | 315/209 R |
| 4,700,113 | 10/1987 | Stupp et al. | 315/224 |
| 4,709,188 | 11/1987 | Roberts | 315/DIG. 7 X |
| 5,084,653 | 1/1992 | Nilsson | 315/DIG. 7 X |
| 5,172,033 | 12/1992 | Smits | 315/224 |
| 5,315,214 | 5/1994 | Lesea | 315/291 X |

*Primary Examiner*—Robert J. Pascal
*Assistant Examiner*—Haissa Philogene
*Attorney, Agent, or Firm*—Cahill, Sutton & Thomas

[57] ABSTRACT

A self-dimming electronic ballast for a gas discharge lamp includes a converter having an unregulated boost circuit coupled to a variable frequency inverter having a series resonant, parallel loaded output. The inverter includes a variable frequency driver circuit having a timing circuit for determining the frequency of the driver. A transistor in the timing circuit operates as an inverting amplifer and is controlled by a signal proportional to the voltage of the AC line. The frequency of the inverter increases with decreasing voltage on the AC line. The ballast can be on the same circuit as incandescent lamps and powered by a triac or variac dimmer for dimming both the incandescent and gas discharge lamps.

14 Claims, 2 Drawing Sheets

SELF-DIMMING ELECTRONIC BALLAST

BACKGROUND OF THE INVENTION

This invention relates to electronic ballasts for gas discharge lamps and, in particular, to an electronic ballast which can be dimmed by any external cause of reduced line voltage, including "brown-out" conditions imposed by electric utilities.

A gas discharge lamp, such as a fluorescent lamp, is a non-linear load to a power line, i.e. the current through the lamp is not directly proportional to the voltage across the lamp. Current through the lamp is zero until a minimum voltage is reached, then the lamp begins to conduct. Once the lamp conducts, the current will increase rapidly unless there is a ballast in series with the lamp to limit current.

A resistor can be used as a ballast but a resistor consumes power, thereby decreasing efficiency, measured in lumens per watt. A "magnetic" ballast is an inductor in series with the lamp and is more efficient than a resistor but is physically large and heavy. A large inductor is required because impedance is a function of frequency and power lines operate at low frequency (50–60 hz.)

An electronic ballast typically includes a rectifier for changing the alternating current (AC) from a power line to direct current (DC) and an inverter for changing the direct current to alternating current at high frequency, typically 25–60 khz. Since a frequency much higher than 50–60 hz. is used, the inductors for an electronic ballast can be much smaller than the inductors for a magnetic ballast.

Converting from alternating current to direct current is usually done with a full wave or bridge rectifier. A filter capacitor on the output of the rectifier stores energy for powering the inverter. The voltage on the capacitor is not constant but has a 120 hz "ripple" that is more or less pronounced depending on the size of the capacitor and the amount of current drawn from the capacitor.

Some ballasts include a boost circuit between the rectifier and the inverter. As used herein, a "boost" circuit is a circuit which increases the DC voltage, e.g. from approximately 180 volts (assuming a 120 volt line voltage) to 300 volts or more for operating a lamp, and which may provide power factor correction. "Power factor" is a figure of merit indicating whether or not a load in an AC circuit is equivalent to a pure resistance, i.e. indicating whether or not the voltage and current are sinusoidal and in phase. It is preferred that the load be the equivalent of a pure resistance (a power factor equal to one).

Because of the non-linear characteristics of a gas discharge lamp, dimming has long been a problem and many solutions have been proposed. Most dimmers include complicated circuitry and all dimmers require external access to the ballast, e.g. by wire running to a dedicated control, a knob on a control shaft extending from the ballast, or optical sensors. Until now, gas discharge lamps could not be controlled by dimmers intended for incandescent lamps, e.g. diodes, triacs, or variacs.

The simplest dimmer for an incandescent lamp is a diode in series with the lamp. The diode cuts off the positive or the negative portion of the A.C. waveform, thereby reducing the power applied to the lamp. Only two light levels are available with a diode, dim and bright. A triac dimmer uses switching circuitry to cut off a variable portion of the A.C. waveform to change the power delivered to a lamp. A variac is a variable transformer which reduces the voltage to a lamp for a range of light levels. A variac differs from a triac in that the output voltage from a variac is sinusoidal. Since many electronic ballasts require a sinusoidal line voltage in order to operate, a variac may seem a likely candidate for dimming a gas discharge lamp driven by an electronic ballast.

Most electronic ballasts sold today do not dim properly, if at all, in response to a reduced line voltage. A gas discharge lamp is essentially a constant voltage load on a ballast and, if lamp current decreases, the voltage across the lamp increases slightly. Consequently, most electronic ballasts stop working abruptly when the line voltage is reduced below a certain level. Thus, a variac cannot be used to dim gas discharge lamps driven by most electronic ballasts.

Some regulated electronic ballasts operate a lamp at constant power by drawing greatly increased current at reduced line voltages. Electrical utilities often control power distribution on a grid with "brown-outs" in which the line voltage is reduced by up to ten percent in some or all of the grid. Regulated power supplies, including ballasts, not only interfere with a utility's ability to control power consumption but make the problem worse by drawing even more current at reduced voltage in order to maintain constant power to a load; e.g. U.S. Pat. No. 4,220,896 (Paice). Unfortunately, the alternative has been to let gas discharge lamps flicker or go out. It is desired that an electronic ballast dim in response to reduced line voltage, thereby helping utilities to achieve their intended purpose with brown-outs.

There are many types of electronic ballasts and this invention relates to what are known as series resonant, parallel loaded ballasts. Such ballasts avoid the necessity of an output transformer by coupling a lamp in parallel with the capacitor of a series resonant inductor and capacitor. The inverter in such a ballast typically operates at a frequency slightly higher than the resonant frequency of the inductor and capacitor and dimming is achieved by raising the frequency of the inverter.

It is a characteristic of series resonant, parallel loaded ballasts of the prior art that the frequency of the inverter decreases as the line voltage decreases. For example, U.S. Pat. No. 4,677,345 (Nilssen) describes a series resonant, parallel loaded ballast in which the inverter includes a "half bridge," i.e. series connected switching transistors. A saturable reactor is connected in the base-emitter circuit of each transistor for switching the transistors at a frequency determined by the saturation time of the reactors. If the line voltage decreases, the reactors saturate more slowly and the frequency of the inverter decreases. As the frequency decreases, the series inductor presents less impedance and prevents lamp current from decreasing in proportion to line voltage. Thus, output power is relatively insensitive to line voltage.

In view of the foregoing, it is therefore an object of the invention to provide a self-dimming electronic ballast.

A further object of the invention is to provide an electronic ballast which reduces power to a gas discharge lamp in response to reduced line voltage to the ballast.

Another object of the invention is to provide an electronic ballast which operates a lamp at reduced power in response to a reduced input voltage, whether the reduced input voltage is from a reduced line voltage or from a dimmer connected between the ballast and an AC line.

A further object of the invention is to provide an electronic ballast for gas discharge lamps which can be on the same circuit as incandescent lamps and controlled by a single dimmer.

Another object of the invention is to provide an electronic ballast in which the frequency of the output current increases as the line voltage decreases.

A further object of the invention is to provide an electronic ballast having a series resonant, parallel loaded output driven by an inverter in which the frequency of the inverter is approximately inversely proportional to the line voltage.

Another object of the invention is to provide a dimmable electronic ballast costing the consumer little if anything more than a non-dimming electronic ballast.

SUMMARY OF THE INVENTION

The foregoing objects are achieved in the invention in which a ballast includes a converter having an unregulated boost circuit coupled to a variable frequency inverter having a series resonant, parallel loaded output. The inverter includes a variable frequency driver circuit having a timing circuit for determining the frequency of the driver. A transistor in the timing circuit operates as an inverting amplifer and is controlled by a signal dependent upon the voltage of the AC line. The frequency of the inverter increases with decreasing voltage on the AC line.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figures 1, 2, 5:
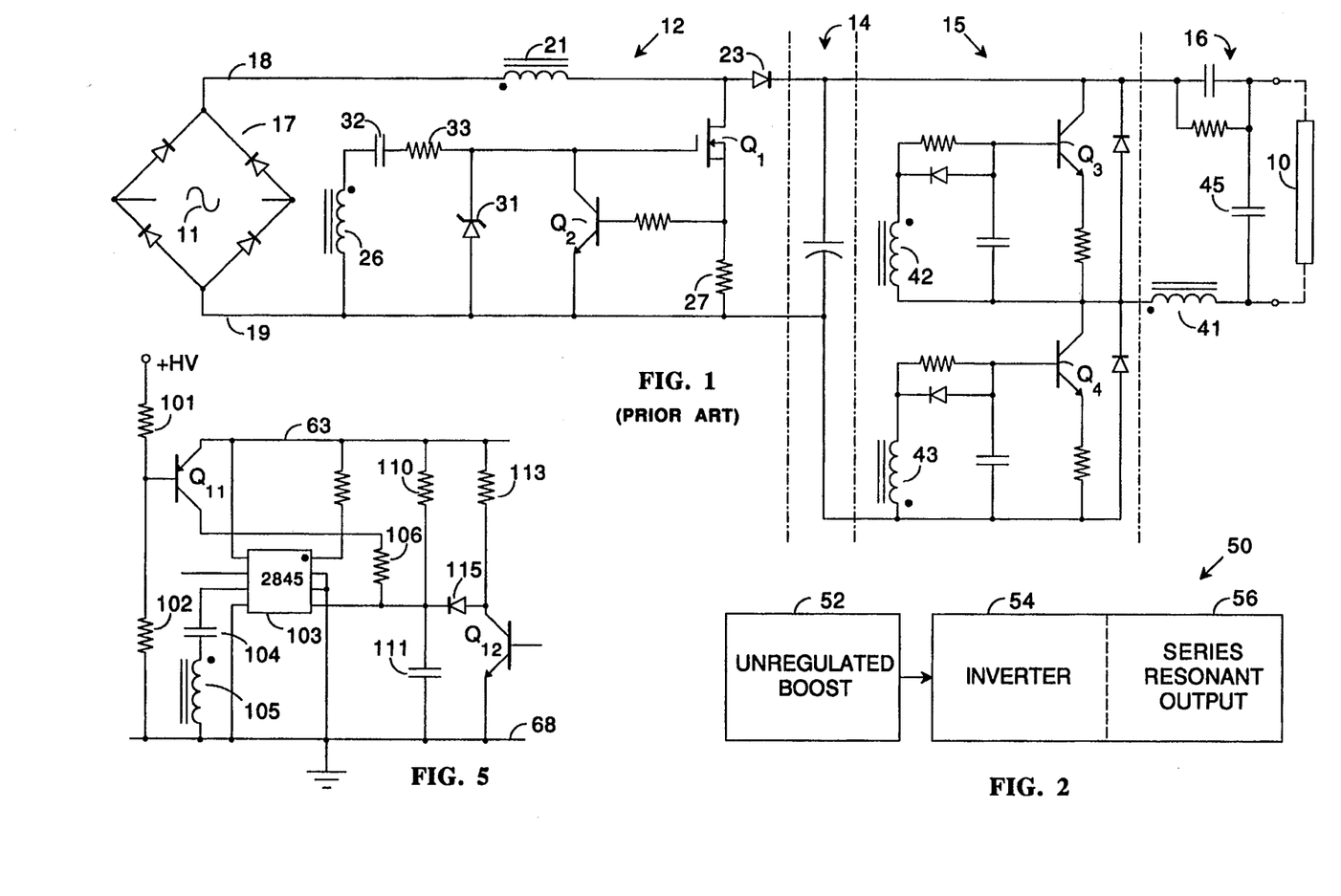
FIG. 1 is a schematic of an electronic ballast of the prior art.
FIG. 2 is a block diagram of a ballast constructed in accordance with a preferred embodiment of the invention.
FIG. 5 illustrates an alternative embodiment of a driver circuit constructed in accordance with the invention.

FIG. 1 illustrates the major components of an electronic ballast for connecting fluorescent lamp 10 to an AC power line, represented by waveform 11. FIG. 1 is an inoperative simplification that is representative of, but not the same as, such prior art as U.S. Pat. No. 4,562,383 (Kirscher et al.) and U.S. Pat. No. 5,214,355 (Nilssen). The electronic ballast in FIG. 1 includes converter 12, energy storage capacitor 14, inverter 15, and output 16. Converter 12 rectifies the alternating current from the AC power line and stores it on capacitor 14. Inverter 15 is powered by the energy stored in capacitor 14 and provides a high frequency, e.g. 30 khz, alternating current through output 16 to lamp 10.

Converter 12 includes bridge rectifier 17 having DC output terminals connected to rails 18 and 19. If rectifier 17 were simply connected to capacitor 14, then the maximum voltage on capacitor 14 would be approximately equal to the peak of the applied voltage. The voltage on capacitor 14 is increased to a higher voltage by a boost circuit including inductor 21, transistor $Q_1$, and diode 23. When transistor $Q_1$ is conducting, current flows from rail 18 through inductor 21 and transistor $Q_1$ to rail 19. When transistor $Q_1$ stops conducting, the field in inductor 21 collapses and the inductor produces a high voltage pulse which adds to the voltage from bridge rectifier 17 and is coupled through diode 23 to capacitor 14. Diode 23 prevents current from flowing back to transistor $Q_1$ from capacitor 14.

A pulse signal must be provided to the gate of transistor $Q_1$ in order to periodically turn $Q_1$ on and off to charge capacitor 14. Inductor 26 is magnetically coupled to inductor 21 and provides feedback to the gate of transistor $Q_1$, causing transistor $Q_1$ to oscillate at high frequency, i.e. a frequency at least ten times the frequency of the AC power line, e.g. 30 khz. The source of an initial pulse signal is not shown in FIG. 1.

A boost circuit and an inverter can each be self-oscillating, triggered, or driven. In addition, each can have a variable frequency or a fixed frequency. The circuit in FIG. 1 is simplified to illustrate the basic combination of converter and inverter. As illustrated in FIG. 1, the boost circuit is a variable frequency boost, unlike the boost circuits shown in the Kirscher et al. and Nilssen patents. Switch-mode power supplies use variable frequency boost circuits and typically exhibit high harmonic distortion. Resistor 27 causes the boost circuit of FIG. 1 have a variable frequency.

Resistor 27, in series with the source-drain path of transistor $Q_1$, provides a feedback voltage which is coupled to the base of transistor $Q_2$. When the voltage on resistor 27 reaches a predetermined magnitude, transistor $Q_2$ turns on, turning off transistor $Q_1$. Zener diode 31 limits the voltage on the gate of transistor $Q_1$ from inductor 26 and capacitor 32 and resistor 33 provide pulse shaping for the signal to the gate of transistor $Q_1$ from inductor 26. Since the voltage drop across resistor 27 will reach the predetermined magnitude sooner as the AC line voltage increases, more pulses per unit time will be produced by the boost, i.e. the frequency will increase. When the AC line voltage decreases, the frequency will decrease.

In inverter 15, transistors $Q_3$ and $Q_4$ are series connected between rails 18 and 19 and conduct alternately to provide a high frequency pulse train to lamp 10. Inductor 41 is series connected with lamp 10 and is magnetically coupled to inductors 42 and 43 for providing feedback to transistors $Q_3$ and $Q_4$ to alternately switch the transistors. The oscillating frequency of inverter 15 is independent of the frequency of converter 12 and is on the order of 25–50 khz. Output 16 is a series resonant LC circuit including inductor 41 and capacitor 45. Lamp 10 is coupled in parallel with resonant capacitor 45 in what is known as a series resonant, parallel coupled or direct coupled output.

If the line voltage increases, then resistor 27 turns transistor $Q_1$ off slightly sooner during each cycle of the boost circuit, thereby increasing the frequency of converter 12. As the frequency of converter 12 increases, the voltage on capacitor 14 increases. If inductors 41, 42, and 43 were saturating inductors, the increased voltage across capacitor 14 would cause the inductors to saturate slightly sooner each cycle because of the increased current. Thus, the frequency of inverter 15 would also increase with increasing line voltage.

FIG. 2 is a block diagram of a ballast constructed in accordance with the invention. In FIG. 2, ballast 50 includes unregulated boost circuit 52 and inverter 54 having series resonant output 56. Boost circuit 52 takes rectified DC voltage, whether or not sinusoidal, and produces power approximately proportional to the square of the input voltage.

Boost circuit 52 is characterized by an input current that is proportional to the input voltage, i.e. boost circuit 52 can include power factor correction circuitry. The output voltage from boost circuit 52 depends upon the input impedance of inverter 54; i.e. the output voltage is unregulated and is high for a high impedance and low for a low impedance. Converter 12 (FIG. 1) and many other types of boost circuits can be used for unregulated boost 52. For example, what are known as buck circuits, buck-boost circuits, and boost circuits are suitable, whether variable frequency or constant frequency.

Inverter 54 differs from inverters of the prior art in that the oscillating frequency of the inverter increases when the input voltage, or the input current, decreases. Inverter 54 is described in greater detail in conjunction with FIG. 4. Series resonant output 56 is similar to output 16 of FIG. 1. A lamp is connected in parallel with the capacitor of the series resonant circuit and the voltage across the capacitor depends upon the frequency of the inverter.

Figure 3:
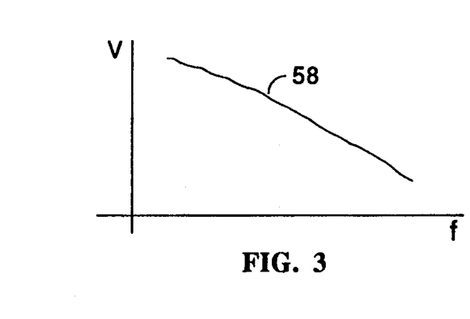
FIG. 3 is a voltage-frequency characteristic curve of a ballast constructed in accordance with the invention.

FIG. 3 illustrates the voltage/frequency characteristic of a ballast constructed in accordance with the invention. Curve 58 shows the change in inverter frequency f with respect to line voltage V. Unlike ballasts of the prior art, the frequency of inverter 54 increases with decreasing line voltage, assuming that the ballast is operating above the resonant frequency of the series resonant circuit. This result is obtained from the combination of the boost circuit, the inverter, and the output. In particular, the boost circuit does not have a fixed output voltage but provides a wide range of output voltages. Second, the output power of the boost circuit is proportional to the square of the line voltage. Third, the frequency of inverter 54 increases with decreasing voltage or current. The output voltage from inverter 54 is relatively constant but the lamp current decreases as the frequency increases. A ballast constructed in accordance with the invention will function at progressively reduced power levels as the input voltage is reduced and can operate on sinusoidal or non-sinusoidal input voltages.

Figure 4:
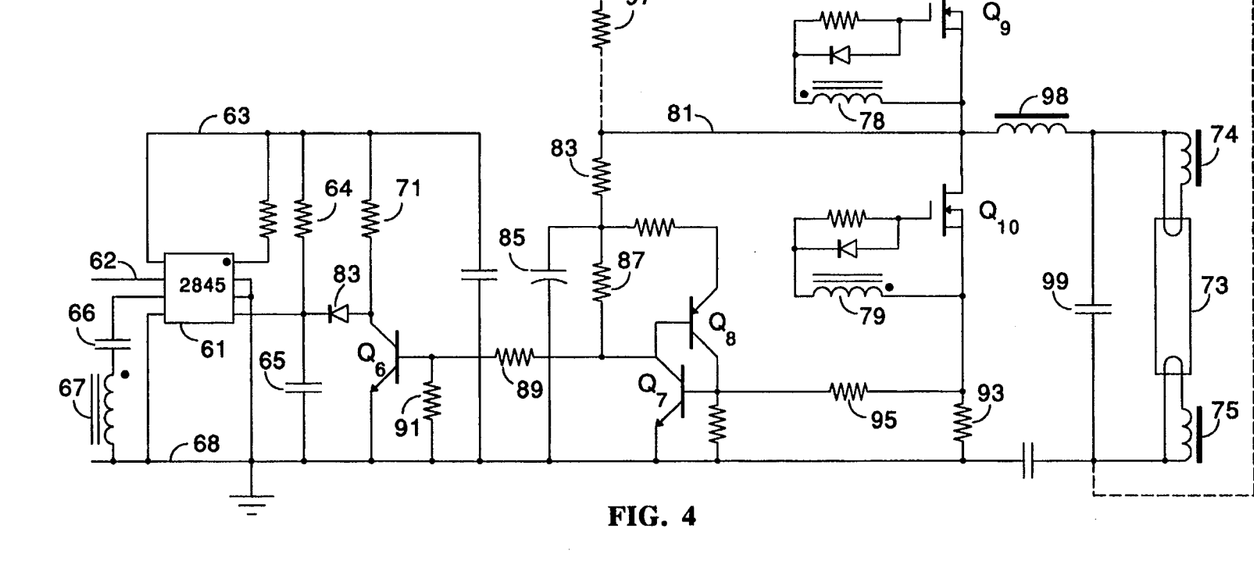
FIG. 4 is a schematic of the inverter and output of a ballast constructed in accordance with the invention.

FIG. 4 illustrates the inverter and output of a ballast constructed in accordance with a preferred embodiment of the invention. In FIG. 4, the inverter includes a variable frequency driver circuit having frequency determining elements including a transistor acting as a variable resistor.

Driver circuit 61 is powered from low voltage line 62 connected to pin 7 and produces a local, regulated output of approximately five volts on pin 8, which is connected to rail 63. In one embodiment of the invention, driver circuit 61 was a 2845 pulse width modulator circuit. In FIG. 4, pin 1 of driver circuit 61 is indicated by a dot and the pins are numbered consecutively clockwise. The particular chip used to implement the invention included several capabilities which are not needed, i.e. the invention can be implemented with a much simpler integrated circuit such as a 555 timer chip.

Pin 1 Of driver circuit 61 relates to an unneeded function and is tied high. Pins 2 and 3 relate to unneeded functions and are grounded. Pin 4 is the frequency setting input and is connected to an RC timing circuit including resistor 64 and capacitor 65. Pin 5 is electrical ground for driver circuit 61 and is connected to rail 68. Pin 6 of driver circuit 61 is the high frequency output and is coupled through capacitor 66 to inductor 67. Inductor 67 is magnetically coupled to inductor 78 and to inductor 79. As indicated by the small dots adjacent each inductor, inductors 78 and 79 are oppositely poled, thereby causing transistors $Q_9$ and $Q_{10}$ to switch alternately at a frequency determined by the RC timing circuit and the voltage on rail 63.

Resistor 71 and transistor $Q_6$ are series-connected between rails 63 and 68 and the junction between the resistor and transistor is connected to the RC timing circuit by diode 83. When transistor $Q_6$ is non-conducting, resistor 71 is connected in parallel with resistor 64 through diode 83. When resistor 71 is connected in parallel with resistor 64, the combined resistance is substantially less than the resistance of resistor 64 alone and the output frequency of driver circuit 61 is much higher than the resonant frequency of the LC circuit including inductor 98 and capacitor 99. When transistor $Q_6$ is saturated (fully conducting), diode 83 is reverse biased and the frequency of driver 61 is only slightly above the resonant frequency of the LC circuit, as determined by resistor 64 and capacitor 65 alone.

Driver 61 causes transistors $Q_9$ and $Q_{10}$ to conduct alternately under the control of inductors 78 and 79. The junction between transistors $Q_9$ and $Q_{10}$ is alternately connected to a high voltage rail, designated "+V", and ground. The junction of transistors $Q_9$ and $Q_{10}$ is connected by line 81 through resistor 83 and capacitor 85 to ground. As transistors $Q_9$ and $Q_{10}$ alternately conduct, capacitor 85 is charged through resistor 83. Capacitor 85 and resistor 83 have a time constant of about one second. The bias network including resistors 83, 87, 89, and 91 causes the average voltage across capacitor 85 to be about five volts during normal operation of the ballast, even though the capacitor is charged from the high voltage rail which is at 300–400 volts.

The voltage on capacitor 85 represents a balance between the current into capacitor 85 through resistor 83 and the current out of capacitor 85 through resistors 87, 89 and 91 to ground. There is also some current to ground through the base-emitter junction of transistor $Q_6$. Transistor $Q_6$ is conductive but does not saturate and the transistor acts as a variable resistance between resistor 71 and ground. Resistor 97 pre-charges capacitor 85 to prevent a current spike in the lamp during start-up and has no effect on the circuit during normal operation.

The voltage on line 81 is proportional to the voltage from the converter, which is determined by the line voltage. If the line voltage should decrease, then the voltage on capacitor 85 decreases, and less current is available at the base of transistor $Q_6$. Transistor $Q_6$ does not switch on or off but operates in a linear mode as a variable resistance. With less current available at the base of transistor $Q_6$, the collector-emitter resistance increases thereby increasing the frequency of driver 61.

Transistor $Q_6$ is a low gain, inverting amplifier which inverts or reverses the sense of the change in line voltage, causing the frequency of the inverter to increase when the line voltage decreases and dimming lamp 73. The reduction in line voltage due to a brown-out is relatively small, e.g. no more than about ten percent, and the dimming of a lamp is barely perceptible. If one connects the ballast to a dimmer such as a triac dimmer or a variac, then a lamp can be dimmed much more because transistor $Q_6$ is operated at very low current gain (a gain of 1-3), i.e. the input current must change considerably before transistor $Q_6$ saturates or shuts off. In one embodiment of the invention, power to a fluorescent lamp was varied between 8 watts and 40 watts using a commercially available triac dimmer and the lamp remained lit throughout this range.

Overvoltage protection is provided by transistors $Q_7$ and $Q_8$ which are a complementary pair connected in SCR configuration. The current through transistor $Q_{10}$ is sensed by resistor 93. The current is converted to a voltage which is coupled by resistor 95 to the base of transistor $Q_7$, which acts as the gate of the SCR. When the voltage across resistor 93 reaches a predetermined level, transistors $Q_7$ and $Q_8$ are triggered into conduction, shorting the base of transistor $Q_6$ to ground and turning off transistor $Q_6$. When transistor $Q_6$ shuts off, the frequency of driver 61 is at a maximum, as described above. When transistor $Q_6$ shuts off, the frequency of driver 61 is sufficiently high for the voltage drop across resonant capacitor 99 to be insufficient to sustain lamp 73 and lamp 73 is extinguished.

FIG. 5 illustrates an alternative embodiment of the invention in which the inverting transistor is connected between the low voltage rail and the frequency control input of the driver circuit. A bias network including series connected resistors 101 and 102 is connected between the high voltage rail (not shown in FIG. 5) and ground rail 68 with the junction of the resistors connected to the base of transistor $Q_{11}$. Driver 103 produces high frequency pulses which are coupled through capacitor 104 and inductor 105 to the control electrodes of the half bridge switching transistors in the inverter (not shown). The operating frequency of driver 103 is determined primarily by series connected resistor 110 and capacitor 111.

Resistor 113 and transistor $Q_{12}$ are series-connected between low voltage rail 63 and ground rail 68 and the junction between the resistor and transistor is connected to the junction of resistor 110 and capacitor 111 by diode 115. Transistor $Q_{12}$ is slowly turned on for starting a lamp and, when transistor $Q_{12}$ is fully conducting, diode 115 is reverse biased to isolate resistor 113 from resistor 110. Transistor $Q_{11}$ and resistor 106 are series connected in parallel with resistor 110. Transistor $Q_{11}$ inverts variations in the voltage on the high voltage rail and the variation in the conductance of the transistor varies the frequency of driver 103 inversely with the variations of line voltage.

The frequency controls illustrated in FIGS. 4 and 5 are superficially similar but operate on different bases. The circuit shown in FIG. 5 is voltage sensitive and the circuit shown in FIG. 4 is current sensitive. Transistor $Q_{11}$ (FIG. 5) has a high gain since variations in line voltage cause only small variations in the high voltage supply. Transistor $Q_6$ (FIG. 4) has low gain since variations in line voltage will cause large changes in current. The currents into and out of capacitor 85 are balanced and the operating point of transistor $Q_6$ is chosen such that transistor $Q_6$ is just conducting (maximum resistance) at minimum lamp brightness.

The invention thus provides a self-dimming ballast which is compatible with dimmers for incandescent lamps and which reduces output power in response to reduced input voltages, such as occur during brownouts. The dimming is accomplished with relatively few components and the ballast is cost competitive with non-dimming ballasts. Dimming is obtained from commercially available dimmers, i.e. no special controls are necessary.

Having thus described the invention, it will be apparent to those of skill in the art that various modifications can be made within the scope of the invention. For example, the source of current for charging capacitor 85 need not be the high voltage rail but can be any source which varies with line voltage. A variable resistance, low gain transistor can be connected in parallel with resistor 64 rather than in parallel with capacitor 65. Instead of a transistor, a voltage variable capacitance can be used to vary the time constant of the RC timing network. In general, any circuit which produces a control signal inversely proportional to the change in line voltage can be used to control the frequency of the inverter.

What is claimed is:

1. A self-dimming electronic ballast for powering a gas discharge lamp from an AC input voltage, said ballast comprising:
   a converter for converting said AC input voltage into direct current at a high voltage;
   a driven, half-bridge inverter powered by said converter, said inverter having a series resonant, direct coupled output for connection to said lamp;
   a control circuit coupled to said inverter for driving said inverter at a frequency inversely proportional to said input voltage.

2. The ballast as set forth in claim 1 wherein said control circuit includes a variable frequency driver circuit having
   a timing circuit for determining the frequency of the driver circuit;
   a transistor connected to said timing circuit and operated as a variable resistance for varying the frequency of said driver circuit.

3. The ballast as set forth in claim 2 wherein said timing circuit includes a bias network coupled to said converter and to said transistor for coupling a control signal to said transistor, wherein said control signal is dependent upon the magnitude of said input voltage.

4. The ballast as set forth in claim 3 wherein said timing circuit includes a resistor and a capacitor, said resistor and said capacitor are connected in series, and said transistor is coupled in parallel with said capacitor.

5. The ballast as set forth in claim 4 wherein said transistor operates at low current gain.

6. The ballast as set forth in claim 3 wherein said timing circuit includes a resistor and a capacitor, said resistor and said capacitor are connected in series, and said transistor is coupled in parallel with said resistor.

7. A self-dimming electronic ballast for powering a gas discharge lamp from an AC line voltage, said ballast comprising:
   a converter for converting said AC line voltage into direct current at a high voltage;
   an inverter coupled to said converter and including
      a pair of series connected, alternately conducting transistors, said transistors switching at a predetermined frequency;

a series resonant, parallel loaded output for coupling said transistors to said lamp;

a control circuit for producing a control signal inversely proportional to said line voltage;

a driver circuit coupled to said transistors, said driver circuit responsive to said control signal for increasing the frequency at which said transistors switch in response to a decrease in said AC line voltage, whereby the current through said lamp decreases when said line voltage decreases.

8. The ballast as set forth in claim 7 wherein said driver circuit includes a resistor, a capacitor, and a third transistor, wherein said resistor and said capacitor are connected in series and said third transistor is coupled in parallel with said resistor.

9. The ballast as set forth in claim 7 wherein said driver circuit includes a resistor, a capacitor, and a third transistor, wherein said resistor and said capacitor are connected in series and said third transistor is coupled in parallel with said capacitor.

10. The ballast as set forth in claim 9 wherein said control circuit includes a storage capacitor charged by direct current from said converter and discharged through said third transistor.

11. The ballast as set forth in claim 10 wherein said third transistor operates at low current gain.

12. A method for dimming a flourescent lamp powered by an electronic ballast coupled to an AC input voltage, said method comprising the steps of:

providing a ballast having a variable frequency inverter and a series resonant, parallel loaded output;

decreasing said input voltage; and increasing the frequency of said inverter in response to a decrease in said input voltage.

13. The method as set forth in claim 12 wherein said decreasing step includes the step of eliminating a portion of each cycle of said AC input voltage.

14. The method as set forth in claim 12 wherein said decreasing step includes the step of reducing the magnitude of said AC input voltage.

* * * * *

REEXAMINATION CERTIFICATE (3492th)

United States Patent [19]
Bezdon et al.

[11] B1 5,396,155
[45] Certificate Issued Apr. 14, 1998

[54] SELF-DIMMING ELECTRONIC BALLAST

[75] Inventors: Ronald J. Bezdon, Antioch; Peter W. Shackle, Arlington Heights; Randy G. Russell, Glen Ellyn; Kent E. Crouse, Hanover Park, all of Ill.

[73] Assignee: Energy Savings, Inc., Schaumburg, Ill.

Reexamination Request:
No. 90/004,294, Jul. 2, 1996

Reexamination Certificate for:
Patent No.: 5,396,155
Issued: Mar. 7, 1995
Appl. No.: 266,746
Filed: Jun. 28, 1994

[51] Int. Cl.⁶ ............................................. G05F 1/00
[52] U.S. Cl. ................... 315/291; 315/307; 315/314; 315/DIG. 4; 315/DIG. 7
[58] Field of Search ......................... 315/291, 307, 315/DIG. 4, DIG. 7, 314, 224, 209 R

[56] References Cited

U.S. PATENT DOCUMENTS

| | | | |
|---|---|---|---|
| 3,611,021 | 10/1971 | Wallace | 315/307 |
| 3,691,450 | 9/1972 | Cox | 315/DIG. 7 |
| 4,473,871 | 9/1984 | Fuchshuber | 315/360 |
| 4,677,345 | 6/1987 | Nilssen | 315/DIG. 4 |
| 4,866,350 | 9/1989 | Counts | 315/209 R |
| 5,371,439 | 12/1994 | Griffen | 315/209 R |

OTHER PUBLICATIONS

"1980 The Radio Amateur's Handbook" Published by the American Radio Relay League 1980.

Berlin "555 Timer Applications Sourcebook with Experiments" Howard W. Sams & Co., Inc. Jun. 13, 1980 pp. 27–31.

*Primary Examiner*—Robert Pascal

[57] ABSTRACT

A self-dimming electronic ballast for a gas discharge lamp includes a converter having an unregulated boost circuit coupled to a variable frequency inverter having a series resonant, parallel loaded output. The inverter includes a variable frequency driver circuit having a timing circuit for determining the frequency of the driver. A transistor in the timing circuit operates as an inverting amplifer and is controlled by a signal proportional to the voltage of the AC line. The frequency of the inverter increases with decreasing voltage on the AC line. The ballast can be on the same circuit as incandescent lamps and powered by a triac or variac dimmer for dimming both the incandescent and gas discharge lamps.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *

REEXAMINATION CERTIFICATE (3492th)

United States Patent [19]
Bezdon et al.

[11] B1 5,396,155
[45] Certificate Issued Apr. 14, 1998

[54] SELF-DIMMING ELECTRONIC BALLAST

[75] Inventors: Ronald J. Bezdon, Antioch; Peter W. Shackle, Arlington Heights; Randy G. Russell, Glen Ellyn; Kent E. Crouse, Hanover Park, all of Ill.

[73] Assignee: Energy Savings, Inc., Schaumburg, Ill.

Reexamination Request:
No. 90/004,294, Jul. 2, 1996

Reexamination Certificate for:
Patent No.: 5,396,155
Issued: Mar. 7, 1995
Appl. No.: 266,746
Filed: Jun. 28, 1994

[51] Int. Cl.$^6$ .......................................... G05F 1/00
[52] U.S. Cl. .................... 315/291; 315/307; 315/314; 315/DIG. 4; 315/DIG. 7
[58] Field of Search .......................... 315/291, 307, 315/DIG. 4, DIG. 7, 314, 224, 209 R

[56] References Cited

U.S. PATENT DOCUMENTS

| | | | |
|---|---|---|---|
| 3,611,021 | 10/1971 | Wallace | 315/307 |
| 3,691,450 | 9/1972 | Cox | 315/DIG. 7 |
| 4,473,871 | 9/1984 | Fuchshuber | 315/360 |
| 4,677,345 | 6/1987 | Nilssen | 315/DIG. 4 |
| 4,866,350 | 9/1989 | Counts | 315/209 R |
| 5,371,439 | 12/1994 | Griffen | 315/209 R |

OTHER PUBLICATIONS

"1980 The Radio Amateur's Handbook" Published by the American Radio Relay League 1980.
Berlin "555 Timer Applications Sourcebook with Experiments" Howard W. Sams & Co., Inc. Jun. 13, 1980 pp. 27–31.

*Primary Examiner*—Robert Pascal

[57] ABSTRACT

A self-dimming electronic ballast for a gas discharge lamp includes a converter having an unregulated boost circuit coupled to a variable frequency inverter having a series resonant, parallel loaded output. The inverter includes a variable frequency driver circuit having a timing circuit for determining the frequency of the driver. A transistor in the timing circuit operates as an inverting amplifer and is controlled by a signal proportional to the voltage of the AC line. The frequency of the inverter increases with decreasing voltage on the AC line. The ballast can be on the same circuit as incandescent lamps and powered by a triac or variac dimmer for dimming both the incandescent and gas discharge lamps.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *